United States Patent
Buckley et al.

(10) Patent No.: US 8,010,105 B2
(45) Date of Patent: Aug. 30, 2011

(54) SYSTEM AND METHOD FOR FACILITATING ACCELERATED NETWORK SELECTION USING A WEIGHTED NETWORK LIST

(75) Inventors: Adrian Buckley, Tracy, CA (US); Michael J. Crowley, Haslet, TX (US)

(73) Assignee: Research In Motion Limited, Waterloo (CA)

( * ) Notice: Subject to any disclaimer, the term of this patent is extended or adjusted under 35 U.S.C. 154(b) by 587 days.

(21) Appl. No.: 11/750,417

(22) Filed: May 18, 2007

(65) Prior Publication Data

US 2007/0268877 A1    Nov. 22, 2007

Related U.S. Application Data

(60) Provisional application No. 60/801,849, filed on May 19, 2006.

(51) Int. Cl.
*H04W 4/00* (2009.01)

(52) U.S. Cl. ........... 455/435.2; 370/329; 455/510

(58) Field of Classification Search .......... 455/432.1, 455/432.2, 435.2, 435.3, 456.1; 370/310, 370/310.2, 335, 342, 351, 352
See application file for complete search history.

(56) References Cited

U.S. PATENT DOCUMENTS

| | | | |
|---|---|---|---|
| 5,896,572 A | 4/1999 | Scotton | |
| 5,950,130 A | 9/1999 | Coursey | |
| 5,974,328 A | 10/1999 | Lee et al. | |
| 5,983,115 A * | 11/1999 | Mizikovsky | 455/512 |
| 6,223,042 B1 | 4/2001 | Raffel | |
| 6,324,400 B1 * | 11/2001 | Shah et al. | 455/434 |
| 2002/0059453 A1 | 5/2002 | Eriksson et al. | |
| 2003/0003922 A1 | 1/2003 | McClure | |
| 2004/0087305 A1 * | 5/2004 | Jiang et al. | 455/432.1 |
| 2004/0192306 A1 * | 9/2004 | Elkarat et al. | 455/435.2 |
| 2004/0192328 A1 | 9/2004 | Giacalone et al. | |
| 2004/0203893 A1 | 10/2004 | Kotzin | |
| 2004/0233868 A1 * | 11/2004 | Farnham | 370/329 |
| 2004/0249915 A1 * | 12/2004 | Russell | 709/223 |
| 2005/0070279 A1 | 3/2005 | Ginzburg et al. | |
| 2005/0130672 A1 | 6/2005 | Dean et al. | |
| 2005/0227720 A1 * | 10/2005 | Gunaratnam et al. | 455/510 |
| 2007/0004404 A1 | 1/2007 | Buckley et al. | |

(Continued)

FOREIGN PATENT DOCUMENTS

EP     0781064 A2    6/1997

(Continued)

OTHER PUBLICATIONS

EPO Search Report in EP Application No. 08172106.0; European Patent Office; Feb. 11, 2009; 11 pages.

(Continued)

*Primary Examiner* — Kent Chang
*Assistant Examiner* — Dinh P Nguyen
(74) *Attorney, Agent, or Firm* — The Danamraj Law Group, P.C.

(57) ABSTRACT

A scheme for facilitating accelerated network selection by a wireless user equipment (UE) device. In one exemplary embodiment, prior to performing a full band scan, the wireless UE device is operable to interrogate a list of networks with which the wireless UE device has registered at least once in a given period of time, wherein a network availability likelihood score may be associated with each of the list of networks. A particular network is selected from the list of networks based on its network availability likelihood score.

20 Claims, 10 Drawing Sheets

U.S. PATENT DOCUMENTS

| | | |
|---|---|---|
| 2007/0004405 A1 | 1/2007 | Buckley et al. |
| 2007/0270142 A1 | 11/2007 | Willey et al. |
| 2010/0156706 A1 | 6/2010 | Farmer |

FOREIGN PATENT DOCUMENTS

| | | |
|---|---|---|
| EP | 1703756 A1 | 9/2006 |
| WO | 0105174 A1 | 1/2001 |
| WO | 0162034 A1 | 8/2001 |
| WO | 03053086 A1 | 6/2003 |
| WO | 2006007218 A1 | 1/2006 |
| WO | 2006044024 A1 | 4/2006 |

OTHER PUBLICATIONS

Canadian Office Action; Application No. 2,551,238; Canadian Intellectual Property Office; Jun. 12, 2009; 4 pages.
European Examination Report; Application No. 05.254 146.3-1525; European Patent Office; Jun. 16, 2009; 3 pages.
Canadian Office Action; Application No. 2,589,948; Canadian Intellectual Property Office; Oct. 7, 2009; 3 pages.
European Search Report; European Patent Office; Nov. 2, 2007; 10 pages.
Canadian Office Action; Application No. 2,551,241; Canadian Intellectual Property Office; Nov. 23, 2009; 4 pages.
Taiwan Office Action; Application No. 095124095; IPO Taiwan; Jan. 22, 2010; 7 pages.
Taiwan Office Action; Application No. 095124093; IPO Taiwan; Jan. 22, 2010; 7 pages.
EPO Communication; Application No. 07108490.9; European Patent Office; Feb. 16, 2010; 5 pages.
Canadian Office Action; Application No. 2,589,961; Canadian IPO; Jul. 6, 2010; 6 pgs.
Chinese Office Action; Application No. 200610110892.6; State IPO of People's Republic of China; Jul. 12, 2010; 4 pgs.
Chinese Office Action; Application No. 200610110892.6; State IPO of People's Republic of China; Sep. 10, 2010; 6 pgs.
Canadian Office Action; Application No. 2,589,948; Canadian IPO; Jul. 12, 2010; 2 pgs.
Examiner's First Report, Application No. 2006202765, IP Australia, dated Apr. 19, 2010, 2 pgs.
EPO Communication, Application No. 07111440.9, European Patent Office, dated Apr. 13, 2010, 6 pgs.
CA Office Action, Application No. 2,551,238, Canadian IPO, Jan. 25, 2011, 2 pgs.
CA Office Action, Application No. 2,551,241, Canadian IPO, Mar. 9, 2011, 2 pgs.
CN Rejection Decision, Application No. 200610110892.6, Chinese IPO, Jan. 26, 2011, 10 pgs.
US Office Action, U.S. Appl. No. 11/712,536, USPTO, Apr. 4, 2011, 18 pgs.

* cited by examiner

LAST RECENT PLMNS LIST STRUCTURE

| Recent Last Networks | Channel/Frequency | Network time stamp | Total time on network |
|---|---|---|---|
| Network IDa | a) Last camped frequency<br>b) Channel/Frequencies | | |
| Network IDb | C-D | | |
| Network IDc | A-F | | |

FIG. 3

NETWORK ID EXPANSION TABLE

| Description | Value | Information Element size bytes |
|---|---|---|
| GSM Cell Information Tag | 'A0' | 1 |
| Camping Frequency Tag | '80' | 1 |
| Camping Frequency Information | | 2 |
| Neighbor Frequency Tag | '81' | 1 |
| Neighbor Frequency Information | | 2*m (8<=m<=32) |
| FDD Cell Information Tag | 'A1' | 1 |
| Intra Frequency Information Tag | '80' | 1 |
| Scrambling code Information | | 2*m (8<=m<=32) |
| Inter Frequency Information Tag | '81' | 1 |
| Scrambling code Information | | 2*(n1+n2+n3) (8<=n1+n2+n3<=32) |
| TDD Cell Information Tag | 'A2' | 1 |
| Intra Frequency Information Tag | '80' | 1 |
| Cell parameters ID | | 2*m (8<=m<=32) |
| Inter Frequency Information Tag | '81' | 1 |
| Cell parameters ID | | 2*(n1+n2+n3) (8<=n1+n2+n3<=32) |

*FIG. 4*

GSM NETWORK EXPANSION TABLE FOR A0

| Description | Value | M/O | Length |
|---|---|---|---|
| GSM Cell Information Tag | | | |
| Length | | | |
| Current camped cell BCCH frequency information tag | | | |
| Length | | | |
| Current stamped BCCH frequency | | | |
| Neighbor Cell BCCH Frequency information tag | | | |
| Length | | | |
| Neighbor BCCH carrier frequencies | | | |

*FIG. 5*

FDD NETWORK EXPANSION TABLE FOR A1 — 600

| Description | Value | M/O | Length |
|---|---|---|---|
| FDD Cell Information Tag | | | |
| Length | | | |
| FDD Intra Frequency Information Tag | | | |
| Length | | | |
| Intra Frequency carrier frequency | | | |
| Intra Frequency scrambling codes | | | |
| FDD Inter Frequency Information Tag | | | |
| Length | | | |
| Inter Frequency carrier frequencies | | | |
| Inter Frequency scrambling codes | | | |

*FIG. 6*

BROADCAST MESSAGE STRUCTURE

| IEI | Information Element | Type/Reference | Presence | Format | Length |
|---|---|---|---|---|---|
| | L2 Pseudo Length 702 | L2 Pseudo Length | M | V | 1 |
| | RR Management Protocol Discriminator 704 | Protocol Discriminator | M | V | 1/2 |
| | Skip Indicator 706 | Skip Indicator | M | V | 1/2 |
| | System Information Type Message Type 708 | Message Type | M | V | 1 |
| | PLMN Channel List 710 | PLMN Channel List | C | TLV | n |

FIG. 7

SYSTEM AND METHOD FOR FACILITATING ACCELERATED NETWORK SELECTION USING A WEIGHTED NETWORK LIST

PRIORITY UNDER 35 U.S.C. §119(e) & 37 C.F.R. §1.78

This nonprovisional patent application claims priority based upon the following prior U.S. provisional patent application: "METHODS AND SYSTEM FOR EFFECTUATING ACCELERATED NETWORK SELECTION IN A RADIO NETWORK ENVIRONMENT BY EMPLOYING WEIGHTED PLMN INFORMAION," Application No. 60/801,849, filed May 19, 2006, in the names of Adrian Buckley and Michael J. Crowley, which is hereby incorporated by reference.

REFERENCE TO RELATED APPLICATIONS

This application discloses subject matter related to the subject matter disclosed in the following commonly owned co-pending U.S. patent application(s): (i) "SYSTEM AND METHOD FOR ACCELERATING NETWORK SELECTION BY A WIRELESS USER EQUIPMENT (UE) DEVICE," filed Jul. 1, 2005; application Ser. No. 11/173,083, in the name(s) of: Adrian Buckley, Andrew Allen and G. Scott Henderson and (ii) "SYSTEM AND METHOD FOR ACCELERATING NETWORK SELECTION BY A WIRELESS USER EQUIPMENT (UE) DEVICE USING SATELLITE-BASED POSITIONING SYSTEM," filed Jul. 1, 2005; application Ser. No. 11/173,040, in the name(s) of: Adrian Buckley and G. Scott Henderson.

FIELD OF THE DISCLOSURE

The present patent disclosure generally relates to communication networks. More particularly, and not by way of any limitation, the present patent application is directed to a system and method for facilitating accelerated network selection by a wireless user equipment (UE) device.

BACKGROUND

When a wireless user equipment (UE) device is first powered up or when it tries to recover from loss of coverage, it is typically required to search for its last registered Public Land Mobile Network (RPLMN) in every supported radio access technology and frequency bands associated therewith before attempting to register on another PLMN. The issue for operators is that when a UE device powers up after a power off condition and subsequent relocation to a new location, it may have to perform a full band scan (FBS) of all supported bands before possibly selecting a National Roaming Partner (NRP). Today, such a full scan already takes a fairly long time in a dense or complex radio environment, which will be further exacerbated when additional frequency bands are introduced and more access technologies are integrated.

In addition, it is important to note that in most scenarios a full band scan can give rise to inefficient utilization of radio and/or battery resources. Relatedly, the time to perform a full scan may be so long that the radio environment may have changed significantly between the time when the scan was started and the time the UE device decides to select a new PLMN. As a result, by the time the UE decides to select a new network, another high priority network may have appeared again.

BRIEF DESCRIPTION OF THE DRAWINGS

A more complete understanding of the embodiments of the present patent disclosure may be had by reference to the following Detailed Description when taken in conjunction with the accompanying drawings wherein:

FIGS. 3-6 depict exemplary tables that include a Last Recent PLMNs list structure as well as certain channel frequency coding schema according to the teachings of the present disclosure;

FIG. 7 depicts a table in which a list of networks is downloaded from a network base unit, such as a cell tower, for purposes of an embodiment of the present disclosure.

DETAILED DESCRIPTION OF THE DRAWINGS

In one embodiment, the present disclosure is directed to a method for facilitating accelerated network selection by a wireless UE device, comprising: prior to performing a full band scan, interrogating a list of networks with which the wireless UE device has registered at least once in a given period of time; determining a network availability likelihood score associated with each of the list of networks; and selecting a network from the list of networks based on its network availability likelihood score.

In another embodiment, the present disclosure is directed to a method of assigning values to networks in a list of networks operable for connecting a wireless UE device, comprising: determining an array of data values corresponding to at least one prior connection attempt of the wireless UE device to a particular network, if the wireless UE device has previously attempted to connect to the particular network; and determining a network availability likelihood score for the particular network based upon the array of data values. It will be realized by one of ordinary skill in the art that an "array" as used herein merely refers to a list of elements, either in one-dimensional form (e.g., a vector) or in multidimensional form. Accordingly, where provided in a vector form, it should be understood that a data vector does not refer to any physical/spatial quantity having a magnitude and direction in conventional sense.

In a still further embodiment, the present disclosure is directed to a wireless UE device, comprising: a storage module operative to contain: (a) a weighting factors array, each weighting factor of the weighting factors array being associated with a data type; (b) a list of networks; and (c) for each network of the list of networks, an array of data values including a data value of each data type; and a computation module operative to determine a network availability likelihood score of a selected network, of the list of networks, based upon the array of data values corresponding thereto and the weighting factors. In one implementation, the storage module may comprise removable storage module such as a Universal Subscriber Identity Module (USIM) card, Removable User Identity Module (RUIM) card, a Subscriber Identity Module (SIM) card, or a compact Flash card, Secure Digital (SD) card, etc., or a memory circuit integrated within the UE device.

Figure 1:
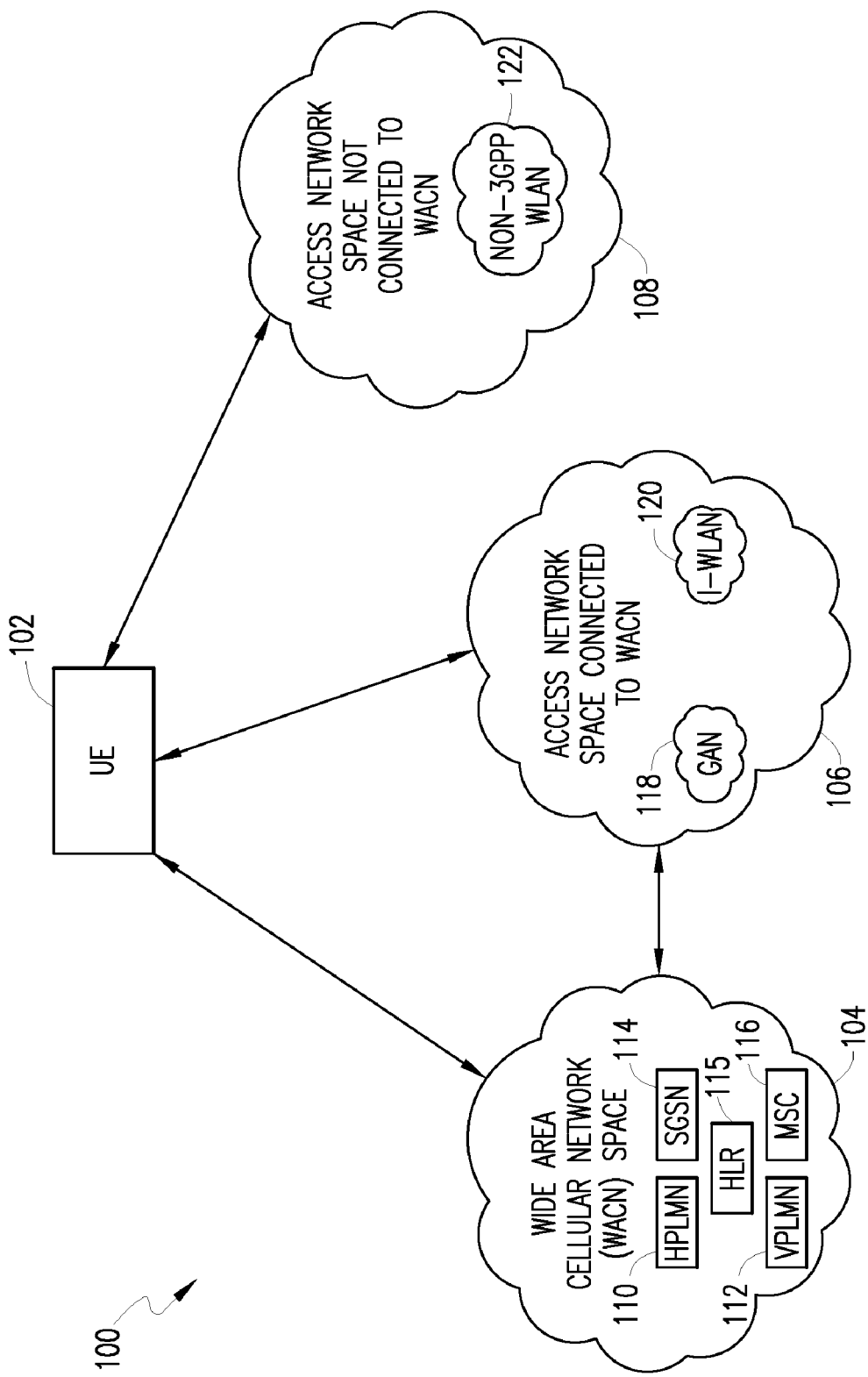
FIG. 1 depicts a generalized radio network environment wherein an embodiment of the present patent disclosure may be practiced when a wireless UE device is relocated to a new geographic area.

An apparatus and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary generalized radio network environment 100 wherein one or more embodiments of the present patent disclosure may be practiced when a wireless user equipment (UE) device relocates to a new geographic area having the exemplary radio environment. For purposes of the teachings herein, a generalized wireless UE device 102 is deemed to be a mobile equipment (ME) device having a removable storage module, and may comprise any portable computer (e.g., laptops, palmtops, or handheld computing devices) or a mobile communications device (e.g., cellular phones or data-enabled handheld devices capable of receiving and sending messages, web browsing, et cetera), or any enhanced personal digital assistant (PDA) device or integrated information appliance capable of email, video mail, Internet access, corporate data access, messaging, calendaring and scheduling, information management, and the like, that is preferably operable in one or more modes of operation and in a number of frequency bands and/or radio access technologies (RATs). For example, UE device 102 may operate in the cellular telephony band frequencies such as 450 MHz, 700 MHz, 900 MHz, 1800 MHz, 1900 MHz, and 2.4 GHz, etc., as well as Wireless Local Area Network (WLAN) bands. Further, other bands in which the UE device could operate wirelessly may comprise Wi-Max bands or one or more satellite bands. Accordingly, for purposes of the present patent disclosure, those skilled in the art should recognize that the term "UE device" or "wireless device" may comprise a ME device (with or without any removable storage module such as a USIM/RUIM/SIM card, or a compact Flash card, SD card, etc.) as well as other portable wireless information appliances, also with or without such storage modules.

By way of illustration, the radio network environment 100 is envisioned having as one or more categories of communication spaces capable of providing service to UE device 102 wherein system acquisition data provisioned with the device may be manipulated in accordance with the teachings set forth herein for purposes of facilitating accelerated network selection. In a wide area cellular network (WACN) space 104, there may exist any number of Public Land Mobile Networks (PLMNs) that are operable to provide cellular telephony services which may or may not include packet-switched data services. Depending on the coverage area(s) and whether the user is roaming, WACN space 104 can include a number of home networks 110 (i.e., home PLMNs or HPLMNs, or equivalent HPLMNs or EHPLMNs), visited networks (i.e., VPLMNs) 112, each with appropriate infrastructure such as Home Location Register (HLR) or Home Subscriber Server (HSS) nodes 115, Mobile Switching Center (MSC) nodes 116, and the like. Since the WACN space 104 may also include a General Packet Radio Service (GPRS) network that provides a packet radio access for mobile devices using the cellular infrastructure of a Global System for Mobile Communications (GSM)-based carrier network, a Serving GPRS Support Node (SGSN) 114 is exemplified therein. Additionally, by way of generalization, the PLMNs of the WACN space 104 may comprise radio access and core networks selected from the group comprising Enhanced Data Rates for GSM Evolution (EDGE) networks, Integrated Digital Enhanced Networks (IDENs), Code Division Multiple Access (CDMA) networks, Time Division Multiple Access (TDMA) networks, Universal Mobile Telecommunications System (UMTS) networks, or any $3^{rd}$ Generation Partnership Project (3GPP)-compliant network (e.g., 3GPP or 3GPP2), e.g., Evolution-Data Optimized (EVDO) networks, all operating with well known technologies, frequency bandwidths and protocols.

Further, UE device 102 is operable to obtain service from an access network (AN) space 106 that is connected to the WACN space 104. In one implementation, the AN space 106 includes one or more generic access networks (GANs) 118 as well as any type of wireless LAN (WLAN) arrangements 120, both of which may be generalized as any wireless AN that is operable to provide access services between UE device 102 and a PLMN core network using a broadband Internet Protocol (IP)-based network. WLAN arrangements 120 provide short-range wireless connectivity to UE device 102 via access points (APs) or "hot spots," and can be implemented using a variety of standards, e.g., IEEE 802.11b, IEEE 802.11a, IEEE 802.11g, IEEE 802.11n, HiperLan and HiperLan II standards, Wi-Max standard (IEEE 802.16 and IEEE 802.16e), OpenAir standard, and the Bluetooth standard (IEEE 802.15), and the like.

Additionally, there may exist an access network (AN) space 108 not interfaced to the WACN space 104 that offers short-range wireless connectivity to UE device 102. For instance, AN space 108 may comprise WLANs 122 offering non-3GPP services, such as communications over "public" access points (hotels, coffee shops, bookstores, apartment buildings, educational institutions, etc., whether free or for fee), enterprise access points, and visited (other enterprise) access points where the user may not be a member of that enterprise but is allowed at least some services.

Based on the foregoing, it should be recognized that the service infrastructure of the radio network environment 100 may be generalized into three broad segments: one or more radio access networks (RANs) (which can include cellular band technologies as well as WLAN technologies), one or more core networks (CNs), and one or more service networks (SNs). Depending on network ownership arrangements and service-level agreements, each RAN may support one or more CNs, each of which in turn may support one or more SNs. Such combinations of infrastructure equipment across multiple owners are sometimes used to create Mobile Virtual Network Operators (MVNOs). In some embodiments, the teachings of the present patent disclosure may equally be applicable to MVNOs as to PLMNs. Since each RAN, CN, or SN may be provided with its own network or system identifier (ID code), numerous RAN-CN-SN combinations may be available in the network environment 100. As will be seen below, regardless of how the exemplary radio network environment 100 to which the user of UE device 102 may have relocated is constituted, scanning/searching sequence order associated with UE device 102 may be advantageously manipulated so as to facilitate accelerated network selection, i.e., without having to perform a time-consuming FBS procedure while attempting to locate a network for service in the exemplary network environment.

Where CDMA networks are exemplified for use by a UE device, such networks may be identified by System Identifiers (SIDs) and Network Identifiers (NIDs), where a SID typically covers the area of a city or large town although there are no strict guidelines or requirements for the size of SIDs. Accordingly, the definition of each CDMA network may be determined by individual operators and/or national regulatory bodies. A "NID" is an optional subdivision of a SID, where a NID can identify, e.g., different rating areas, toll areas, private networks, MSC boundaries, or any other subdivision that an operator may want to distinguish within a SID. A national operator may have coverage over an entire country, where for certain countries, this can amount to tens and sometimes hundreds of cities/regions being covered.

WLANs may be identified by means of Service Set IDs (SSIDs) and GSM networks may be identified by means of Mobile Country Code (MCC) and Mobile Network Code (MNC) combinations. Further, different networks in a particular technology, e.g., GSM, may support different bands, e.g., selected from 450 MHz, 700 MHz, 850 MHz, 900 MHz, 1800 MHz, and 1900 MHz. Likewise, CDMA technology (IS-95) networks may operate in two bands, 850 MHz and 1900 MHz, although additional bands may be added. In addition, there may be more than one system and acquisition table provisioned for a UE device, which may be integrated into a single database. As to storage, as alluded to before, the database structures along with certain network lists described below may be embodied in a removable module such as SIM, RUIM, USIM, Flash memory, or a storage memory circuit integrated within the UE device.

From time to time, the UE device 102 may occasionally be powered up after a power off condition and subsequent relocation to a new location, or may occasionally try to recover from loss of coverage, or may occasionally be required to change from one network to another. In a new environment, the UE device 102 may be configured to attempt to acquire a network; that is, to attempt to connect to a network. In such situations, the UE device 102 may be operative to perform an FBS or a modified scan sequence as set forth herein.

In an FBS, the UE device 102 may be configured to search for its last registered Public Land Mobile Network (RPLMN) in every supported radio access technology and frequency bands associated therewith before attempting to register on another PLMN. If the last PLMN is no longer available, the UE device 102 may then begin to search for networks according to a search/scan configuration scheme installed within the UE device 102 by a manufacturer, vendor or reseller.

In one embodiment, before beginning the FBS, the UE device 102 may attempt to search for a network in accordance with a method that includes at least one teaching of the present disclosure involving a stored network database structure (e.g., a list) for facilitating accelerated network selection. The method may facilitate selecting a particular network from a list of networks for connecting the UE device 102 based on certain criteria as will be described in detail hereinbelow. As alluded to previously, the list may be maintained, for example, within a storage module associated with the UE device 102, or may be maintained in another device that is accessible to the UE device 102. Each network of the list of networks may have a network availability likelihood score corresponding thereto, and the UE device 102 may be configured to attempt to connect to each network in the list of networks, in an order determined in accordance with the network availability likelihood score. An FBS may not be required, unless no network of the list of networks is presently available.

In other words, rather than (or prior to) searching all of the networks in an order programmed into the UE device 102 by a manufacturer, vendor, or reseller (e.g., in a system acquisition database), the UE device 102 may search a list of networks in accordance with a network availability likelihood score for each network identified in a storage structure. In another variation, the search sequence order associated with the system acquisition database may be manipulated based on the network availability likelihood score to accelerate network selection.

The list of networks may preferably include one or more networks with which the UE device 102 has previously and/or recently connected, or of networks with which the UE device 102 has attempted to connect. If desired, the list of networks may be limited to include only those networks with which the UE device 102 has connected within a recent period of time, e.g. one month, or with which a connection has exceeded a threshold signal strength or with no more than a threshold bit error. The UE device 102 may then iteratively search through the list of networks, rather than (or prior to) performing FBS, searching for a particular network whose network availability likelihood score indicates a high likelihood that the selected network may be available.

Since the UE device 102 may have been moved since it was last connected to any network, and since networks may become unavailable from time to time, the list of networks may include networks that are not presently available. For example, if the UE device 102 is taken on an international trip, only some of the networks to which the UE device 102 has previously been connected may be available. Similarly, the list of networks may include more than one network that is presently available. In a new location, several networks with which the UE device 102 has never previously connected may be available.

The list of networks may include at least one of: a WLAN network, an EVDO network, a Home or Equivalent Home PLMN (EHPLMN or HPLMN), any variety of UMTS networks (e.g., UMTS 800, UMTS 1900, UMTS 2100, and the like) or GSM networks (e.g., EGSM900, GSM1800, GSM850, GSM1900 network, and so on), a TDD network, an FDD network, a 3GPP/3GPP2-compatible network, to name a few. Where a WLAN is involved, it may be operable with a number of applicable standards as exemplified previously. The list of networks may be organized as a table, as a linked list, or as any other data structure. For example, the list of networks may be maintained as a table in which each row corresponds to a network, and having a column with an index according to which the networks of the list of networks may be searched. In another implementation, the index may be replaced with a pointer to another network having a lower network availability likelihood score. In yet another implementation, the list of networks may be maintained as a table of data arrays having information regarding previous connection attempts, and the list of networks may be searched in accordance with a network availability likelihood score that is determined on-the-fly based upon the data arrays, which may be weighted depending on certain factors.

If the list of networks is not indexed, then the UE device 102 may search through the list of networks to find a network whose network availability likelihood score indicates a greater likelihood of network availability than any other network of the list of networks. The UE device 102 may select a "most likely" network, and then may select a different network of the list of networks if the list of networks has more than one network and if the different network has a network availability likelihood score indicating a greater likelihood of being available. Since the list of networks may have only a few networks therein, and since the processing speed of the UE device 102 can be significant, a network of the list of networks can be selected promptly.

In some implementations, the UE device 102 may be capable of transmitting and receiving data over more than one channel, or of connecting to more than one network, simultaneously. Accordingly, more than one network of the list of networks may be selected. If the UE device 102 has an antenna or other port, or group of antennae and ports, that is/are capable of simultaneously communicating over more than one channel, or via more than one network, then more than one network may be selected.

As each network of the list of networks may be selected in an iterative process, the UE device 102 may attempt to connect to the selected network that has the highest availability score. If a connection attempt is not successful, then the UE device 102 may then search through the list of networks to find a yet-untried network whose network availability likelihood score indicates a greater likelihood of network availability than any other yet-untried network of the list of networks. Accordingly, the UE device 102 may iteratively attempt to connect to each network in the list of networks in an order determined in accordance with the network availability likelihood score of each network.

The exemplary methodology may thus comprise determining a network availability likelihood order, in accordance with the network availability likelihood score for each network of the list of networks, such that a scan/search sequence other than a default sequence may be implemented in order to accelerate network selection. Whereas the network availability likelihood scores may be stored in some sorted order, it need not be the case since the search sequence order may employ pointers to point to the actual sequence of searching regardless of the location of the networks within the database.

In one embodiment, the method may also include a Modified Full Band Scan (MFBS). If no network of the list of networks is presently available, the UE device 102 may perform a MFBS. The MFBS is similar to an FBS, but omits attempts to connect to networks that are in the list of networks. Since the MFBS proceeds after the UE device 102 has already determined that no network of the list of networks is presently available, the networks of the list of networks need not be tried within the MFBS.

The UE device 102 may maintain an array of data values for each network in the list of networks, for each successful connection attempt, and/or for each connection attempt regardless of success. By determining an array of data values corresponding to at least one connection attempt (on a per-network basis, for example, such as duration of most recent call, total duration of all calls, number of connection attempts that have been successful, number of connection attempts that have been unsuccessful, percentage of connection attempts that have been successful, time since a most recent successful connection, etc.), the UE device 102 may be able to update the network availability likelihood score based on certain weighting, smoothing, or normalization techniques.

The array of data values corresponding to the selected network may include at least one of: (a) a connections count, corresponding to a number of prior connections of the wireless UE device with the selected network; (b) a minutes count, corresponding to a total duration of prior connections of the wireless UE device and the selected network; and (c) a time lapse value, corresponding to an amount of elapsed time since at least one prior connection of the wireless UE device and the selected network.

In response to each successful connection, and/or in response to each connection attempt regardless of success, the data arrays may be updated. Alternatively, the data arrays may be updated from time to time, e.g., periodically. Moreover, if no network of the list of networks is presently available and an FBS and/or a MFBS identifies a network that is available, then the list of networks may be updated to include the network that is available, and may store a data array (or several data arrays) corresponding thereto. For each network, the UE device 102 may store a count of a number of successful connection attempts, a count of a number of unsuccessful connection attempts, and/or a count of a number of total connection attempts; if a connection attempt is successful, then the UE device 102 may create a data array indicating a duration of the connection, a time stamp, and/or other data. The array of data values corresponding to any network may be updated on-the-fly, i.e. in response to a connection attempt, regardless of whether the connection attempt is successful, and/or may be updated when a connection is terminated (so that the duration of the connection may be more easily calculated).

From time to time, the UE device 102 may update the network availability likelihood score. In one implementation, the UE device 102 may update the network availability likelihood score in response to a successful connection attempt, and/or in response to an unsuccessful connection attempt. In another implementation, the UE device 102 may update the network availability score each time a connection is terminated. In yet another implementation, the UE device 102 may update the network availability score for each network in the list of networks each time the UE device 102 is powered on and/or is powered off. The network availability likelihood score may be updated on-the-fly, i.e. for each network whenever the UE device 102 is powered up or when it tries to recover from loss of coverage, or may be updated as a background process in preparation for a subsequent power-up or recovery from loss of coverage. The network availability likelihood score may also or alternatively be updated periodically, e.g. in response to every $n^{th}$ connection, every $n^{th}$ connection attempt, and/or whenever no update has occurred within a predetermined number of days. The time stamp may be particularly relevant where a network may be available only during certain hours of each day, or only during weekdays or only during weekends. Also, since different networks may have different costs associated therewith, the network likelihood availability score may be biased in favor of less expensive networks.

For example, if the UE device 102 maintains both a count of total connection attempts and a count of successful connection attempts for each network of the list of networks, then the UE device 102 may be able to determine a percentage of connection attempts that have been successful. If a connection attempt is successful, then the network availability likelihood score may be modified to indicate that the network is more likely to be available for subsequent connection attempts; if a connection attempt is not successful, then the network availability likelihood score may be modified to indicate that the network is less likely to be available for subsequent connection attempts. Those skilled in the art will recognize that such computations may be modulated or refined further based on other factors as well.

In updating the network availability likelihood score, the UE device 102 may evaluate one or more arrays of data values corresponding to at least one prior connection attempt of the wireless UE device to one or more networks of the list of networks, if the wireless UE device has previously attempted to connect to the selected network. The UE device 102 may also update an order in which the list of networks is searched. The UE device 102 may compare the network availability likelihood score that has been updated with a network availability likelihood score of at least one other network in the list of networks. The UE device 102 may update an index and/or a linked list of networks to reflect an updated order, such that upon a subsequent execution of the method the UE device 102 can attempt to connect to each network of the list of networks in an order of decreasing likelihood of network availability.

The order may be updated on-the-fly, i.e. for each network whenever the UE device 102 is powered up or when it tries to recover from loss of coverage, or may be updated as a background process in preparation for a subsequent power-up or recovery from loss of coverage.

Updating the network availability likelihood score may include determining a function of (a) a weighting factors array and (b) the array of data values. In one exemplary embodiment, determining the function includes at least one of, inter alia: (a) multiplying a connections count, corresponding to a number of prior connections of the wireless UE device and the selected network, by a connections count weighting factor of the weighting factors array; (b) multiplying a minutes count, corresponding to a total duration of prior connections of the wireless UE device and the selected network, by a minutes count weighting factor of the weighting factors array; and (c) multiplying a time lapse value, corresponding to an amount of elapsed time since at least one time/date stamp of at least one prior connection of the wireless UE device and the selected network, by a time lapse weighting factor of the weighting factors array. It will be appreciated that other parameters and/or variables may also be employed, which may involve their own corresponding weighting factors or values.

Additionally, the UE device 102 may update the weighting factors also, either periodically or otherwise. For example, the UE device 102 may update the weighting factors in response to each connection attempt. Various filtering approaches, such as adaptive filtering, may be used to update the weighting factors. The weighting factors may be updated periodically, e.g. in response to every $n^{th}$ connection, every $n^{th}$ connection attempt, and/or whenever no update has occurred within a predetermined number of days. One embodiment may comprise adjusting at least one weighting factor of the weighting factors array, such that the selected network is more likely to be selected upon a subsequent connection attempt. The method may further comprise at least one of: updating the connections count corresponding to the selected network; updating the minutes count corresponding to the selected network; and appending a time/date stamp to a list of time/date stamps corresponding to the selected network.

Accordingly, the methodology may comprise iteratively attempting a connection to each network of the list of networks in accordance with the network availability likelihood order until a connection attempt is successful; updating the array of data values corresponding to the selected network for which the connection attempt is successful; and updating the weighting factors array such that, within the network availability likelihood order, each network precedes each other network that is less likely to be available.

While updating the data arrays may be performed without significant computation, and while updating the network availability likelihood score for a network may be performed in response to the data arrays, updating the weighting factors may be more involved, and may include adjusting the means, modules and/or methods by which the network availability likelihood score is updated. Accordingly, updating the weighting factors may provide "feedback" to the updating of the network availability likelihood score.

An update module may be included, and may perform the updating of the data arrays, the network availability likelihood score, and/or and the weightings arrays. The update module may be operative to (a) update the weighting factors array such that the selected network is more likely to be selected upon a subsequent connection attempt, and (b) update the array of data values corresponding to the selected network, in response to a connection attempt of the wireless UE device and the selected network.

The update module may reside within a computation module, which may further be operative to determine a network availability likelihood score of each network, of the list of networks, based upon the array of data values corresponding thereto and based upon the weighting factors; and to assign a network availability likelihood order to each network, of the list of networks, in accordance with the array of data values corresponding thereto and in accordance with the weighting factors array.

Thus, an embodiment of a wireless UE device, such as the UE device 102 may comprise a storage module or storage means, and a computation module or computation means. The storage module or storage means is operative to contain: (a) a weighting factors array, each weighting factor of the weighting factors array being associated with a data type; (b) a list of networks; and (c) for each network of the list of networks, an array of data values including a data value of each data type. The computation module or computation means is operative to determine a network availability likelihood score of a selected network, of the list of networks, based upon the array of data values corresponding thereto and based upon the weighting factors.

The wireless UE device may accordingly also comprise an update module, in software, hardware, firmware, or in any combination thereof in suitable means, operative to (a) update the weighting factors array such that the selected network is more likely to be selected upon a subsequent connection attempt, and (b) update the array of data values corresponding to the selected network, in response to a connection attempt of the wireless UE device and the selected network. In one implementation, the array of data values corresponding to the selected network includes at least one of: (a) a connections count, corresponding to a number of prior connections of the wireless UE device and the selected network; (b) a minutes count, corresponding to a total duration of prior connections of the wireless UE device and the selected network; and (c) a time lapse value, corresponding to an amount of elapsed time since at least one prior connection of the wireless UE device and the selected network. Additionally, as alluded to previously, the computation means associated with the UE device is further operative to: determine a network availability likelihood score of each network, of the list of networks, based upon the array of data values corresponding thereto and based upon the weighting factors; and assign a network availability likelihood order to each network, of the list of networks, in accordance with the array of data values corresponding thereto and in accordance with the weighting factors array.

Figure 2A:
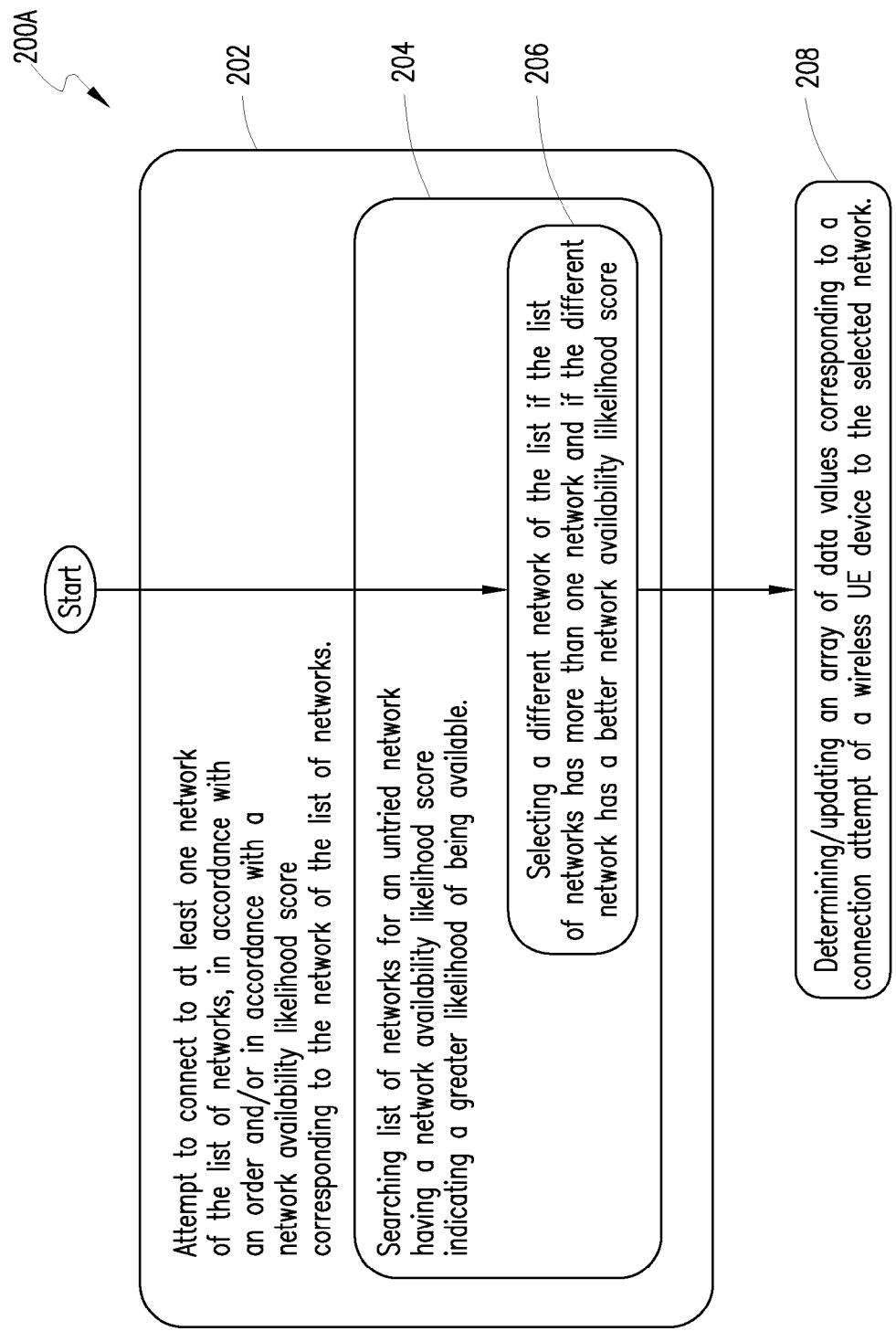
FIGS. 2A-2C depict exemplary embodiments relating to an overall scheme for selecting a particular network from a list of networks for connecting a wireless UE device.
Figure 2B:
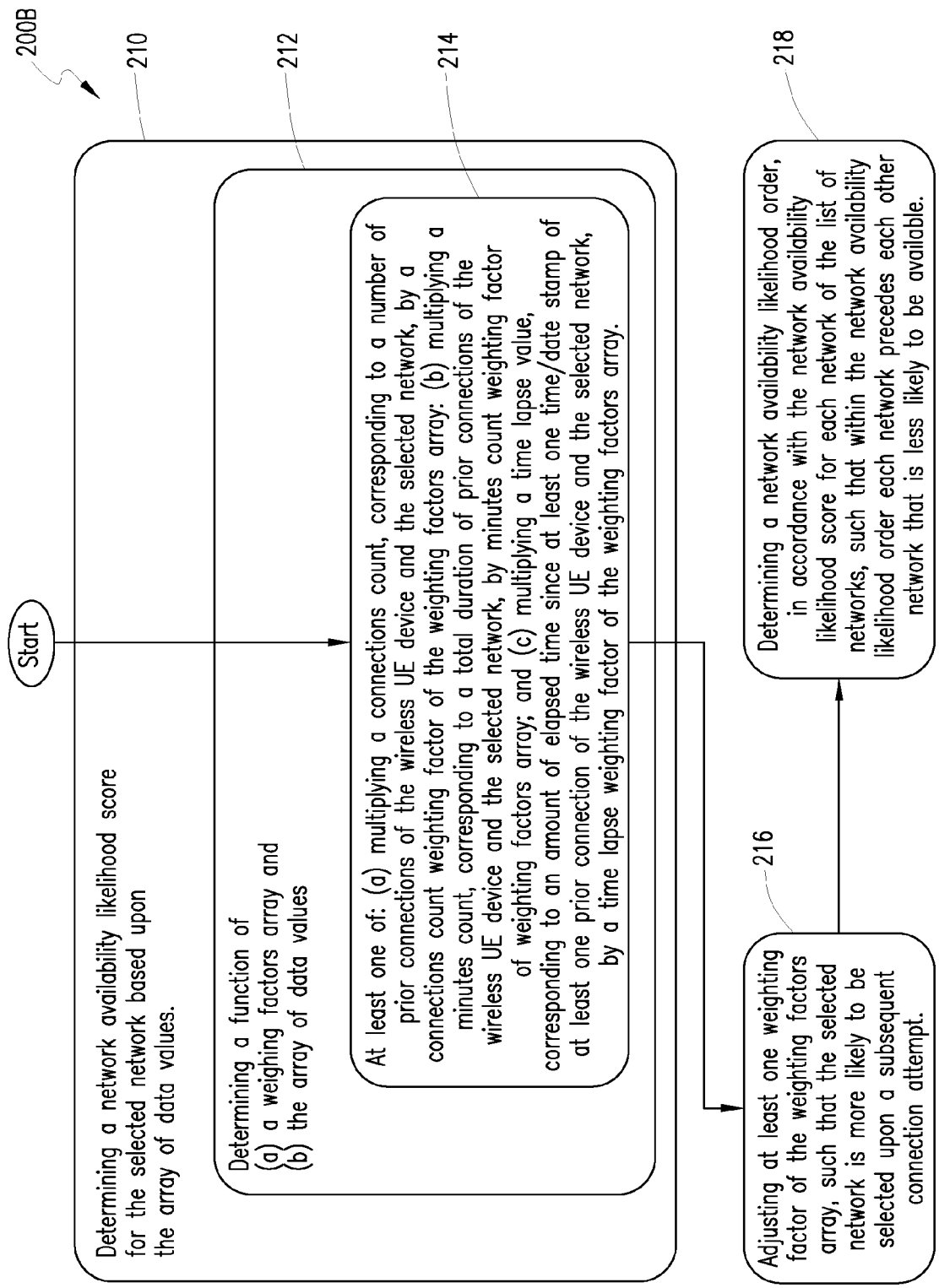
Figure 2C:
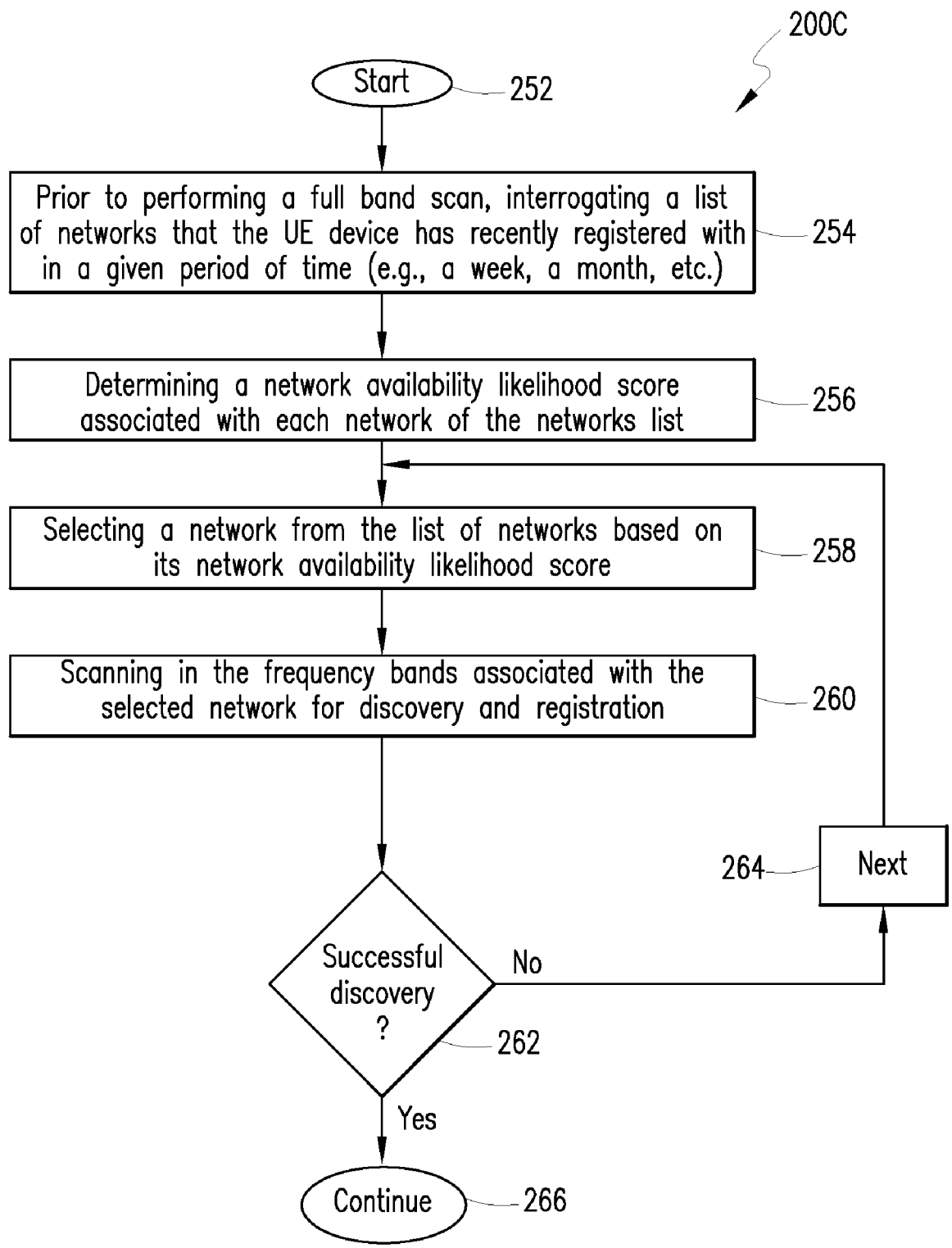

Referring now to FIGS. 2A-2C, depicted therein are exemplary embodiments relating to selecting a particular network from a list of networks for connecting a wireless UE device in accordance with the teachings set forth hereinabove. In particular, FIG. 2C depicts an overall scheme 200C wherein an FBS procedure may be advantageously avoided. Upon starting (block 252), which may involve e.g., re-powering the device after a loss of network connectivity, a list of networks may be interrogated prior to performing an FBS (block 254), wherein the list of networks is preferably populated with the networks with which the UE device has recently registered or in a given period of time (such as, for instance, a week, a month, etc.). A network availability likelihood score associated with each network may be determined as described herein (block 256), whereby a network may be selected based on its network availability likelihood score (block 258). Scanning may be effectuated in one or more frequency bands associated with the selected network for network discovery and subsequent registration (block 260). If there is no successful discovery and/or registration (block 262), the process flow may iteratively select the next likely network (blocks 264 and 258). Once a network is discovered, normal telecommunications operations may ensue thereafter (block 266).

With respect to FIGS. 2A and 2B, depicted therein is an exemplary methodology including assignment of values to networks in a list of networks operable for selection by a wireless UE device. As alluded to in the foregoing sections, the list of networks may include a variety of networks. As illustrated herein, an embodiment 200A may include attempting to connect (block 202) to at least one network of the list of networks, in accordance with an order and/or in accordance with a network availability likelihood score corresponding to the network of the list of networks. The method may include searching a list of networks (block 204), i.e. selecting a network of the list of networks and then selecting a different network of the list of networks (block 206) if the list of networks has more than one network and if the different network has a network availability likelihood score indicating a greater likelihood of being available.

Embodiment 200A may include determining and/or updating an array of data values (block 208) corresponding to at least one connection attempt of the wireless UE device to the selected network. The process may also comprise updating the connections count corresponding to the selected network, updating the minutes count corresponding to the selected network, and appending a time/date stamp to a list of time/date stamps corresponding to the selected network.

In another aspect, embodiment 200B relates to determining a network availability likelihood score for a selected network (block 210) based upon the array of data values. Determining a network availability likelihood score for the selected network further may include determining a function (block 212) of (a) a weighting factors array and (b) the array of data values. The function may correspond to the means, modules and/or methods described above. Specifically, the method may include (block 214) any known or heretofore unknown statistical and/or mathematical computations involving arrays, such as scalar product computations as exemplified hereinabove.

Embodiment 200B may further comprise adjusting (block 216) at least one weighting factor of the weighting factors array, such that a selected network is more likely to be selected upon a subsequent connection attempt. Additionally, as the network availability likelihood score is updated, the method may include determining a network availability likelihood order (block 218), in accordance with the network availability likelihood score for each network of the list of networks. For instance, the scores may be sorted such that within the network availability likelihood order each network precedes each other network that is less likely to be available. Furthermore, it should be appreciated that the various operations set forth herein and elsewhere may be accomplished via a number of means, including software (e.g., program code), firmware, hardware, or in any combination, usually in association with a processing system. Where the processes are embodied in software, such software may comprise program instructions that form a computer program product, uploadable service application software, or software downloadable from a remote station, and the like.

Based on the foregoing, an exemplary application scenario may be described as follows. Since most people travel in a limited geographic area (home, work, school/daycare, gym, shopping mall, etc.), the network list associated with a subscriber would be relatively short. When the wireless UE device powers-on or otherwise seeks to acquire service, the PLMNs on the recent list would be checked to see if service is available from any of these PLMNs. If service is not available from any of the PLMNs on the list, an FBS or modified FBS may be initiated as alluded to previously. The network list could preferably be weighted so that most-frequently used PLMNs would be searched before less-frequently used ones. For example, the PLMN providing coverage for a user's home or work would probably be used more frequently than PLMNs used while traveling between home and work or while traveling out of the user's normal habitat. The weighing factor would be based on the amount of time spent in a PLMN coverage area. The list could also be weighted based on where service is usually reacquired. For example, if the user loses coverage while in an elevator or traveling through a tunnel, service would be reacquired after leaving the elevator or exiting the tunnel. So, the PLMNs at the reacquisition points would be prioritized higher even through the amount of time spent being served by the PLMN may be shorter than at the user's home or office. Similarly, if the user typically turns the wireless UE device off while having lunch and turns it on again afterward, the PLMN serving his favorite restaurant would have a higher priority on the reacquired service list than his home or office (where he spends more time).

FIGS. 3-6 depict exemplary database embodiments, e.g., tables, that include a Last Recent PLMNs list structure as well as certain channel frequency coding schema according to the teachings of the present disclosure. Table 300 of FIG. 3 may include a data array for each network of the list of networks. For example, in a first row, table 300 may include a data array or data vector pertaining to a network identified by a network IDa 302. The first row array may also include a channel and/or frequency band(s) 304 on which the UE device was last camped as well as a network time stamp 306 and a total time on network value 308. Other rows of the table of FIG. 3 may include other data arrays pertaining to other networks, e.g., IDb 310 and IDc 312, and may also include networks available nearby (i.e., "neighbor frequencies").

The network time stamp 306 may be available directly from one or more networks, or may be maintained by a clock within the UE device. If available via the network, it is the last known time that the UE device made a registration on that network. In the case of GSM, the network time stamp may be associated with a Location Update, or in the case of GPRS, it may be associated with an Attach or Routing Area Update. The total time on network 308 may comprise the amount of time the UE device has spent on a network, which may be used to sort the networks in accordance with some order. A clock within the UE device may allow the UE device to determine a time stamp for unsuccessful connection attempts as well as for successful connection attempts. If a clock maintains the network time stamp 306, then the clock may be updated when a connection attempt is successful. A separate time stamp may be maintained for each connection attempt, or a time stamp may be maintained only for a most recent successful connection attempt. With respect to the channel/frequency column 304 of the network list 300, various known channel frequency coding schemes may be used wherein certain channels or frequencies may be scanned to find a particular network.

FIG. 4 depicts a Network ID Expansion Table 400 in accordance with one implementation of the embodiment described with respect to FIG. 3. For example, in FIG. 3, a network ID (network IDa) 302 may be associated with a pointer that points to a block 402 of data (pertaining to the network IDa) in a collection of table rows identified in block 402 within the Network ID Expansion Table 400 of FIG. 4. Similarly, a network ID (network IDb) 310 may be associated with a pointer to a block 404 of data (pertaining to the network IDb) in a collection of table rows identified in the block 404, and a network ID (network IDc) 312 may be provided with a pointer to a block 406 of data (pertaining to the network IDc) in a collection of table rows identified in the block 406. The data within each table may be stored as a TLV (i.e., a type/value/length) data format.

Table 500 depicted in FIG. 5 may allow further expansion of the table depicted in FIG. 4, which may be useful when a tag "A0" is present within a GSM block of data. Similarly, table 600 depicted in FIG. 6 may allow further expansion of the table depicted in FIG. 4, which may be useful when a tag "A1" is present within an FDD block of data. Although not shown, a similar table may also allow further expansion of the table depicted in FIG. 4, which may be useful when a tag "A2" is present within a TDD block of data.

FIG. 7 depicts a table 700 in which a list of networks may be downloaded from a network base unit, such as a cell tower, which may be operable according to the teachings of one embodiment of the present disclosure. The network base unit and the UE device may be preloaded with an extensive list of licensed networks, and the list of networks may therefore be implemented as a set of network identifiers indicating which licensed networks are available in a particular location. The list of networks may be provided from the network base unit via a broadcast message, in accordance with a broadcast message structure depicted in FIG. 7 wherein a column of Information Element Identifiers (IEIs) are provided. Each IEI may include an L2 Pseudo Length 702, a Radio Resource (RR) Management Protocol Discriminator 704, a Skip Indicator 706, and a System Information Type/Message Type 708. Finally, the broadcast message structure may include the list of networks, identified in FIG. 7 as a PLMN Channel List 710.

Figure 8:
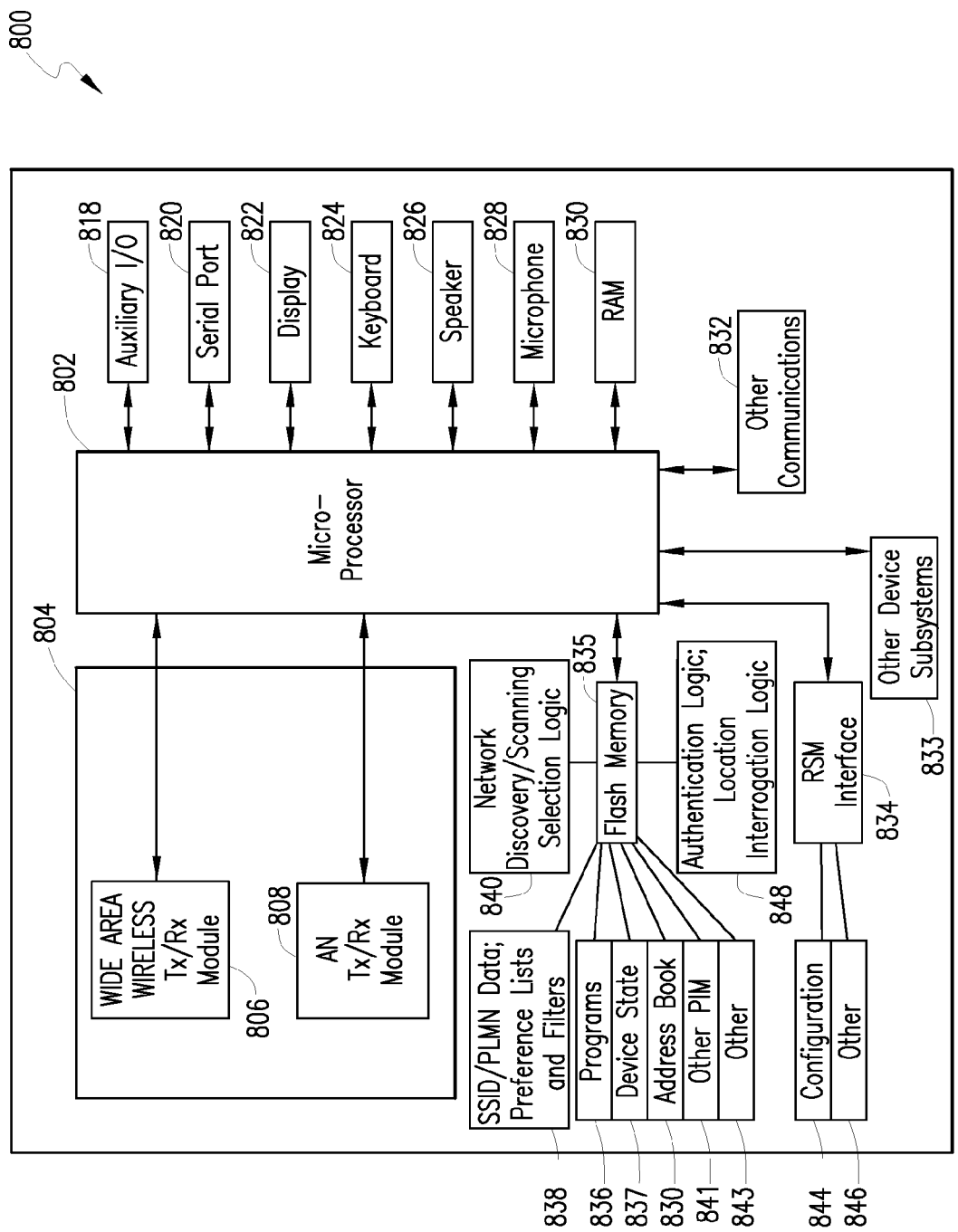
FIG. 8 depicts a block diagram of an embodiment of a wireless device or UE/ME (user equipment/mobile equipment) device operable to accelerate network selection according to the teachings of the present patent disclosure.

FIG. 8 depicts a block diagram of an embodiment of a wireless device or UE/ME device (designated UE device 800) operable to accelerate network selection according to the teachings of the present patent disclosure. It will be recognized by those skilled in the art upon reference hereto that although an embodiment of UE device 800 may comprise UE 102 shown in FIG. 1, there can be a number of variations and modifications, in hardware, software or firmware, with respect to the various modules depicted. Accordingly, the arrangement of FIG. 8 should be taken as illustrative rather than limiting with respect to the embodiments of the present patent disclosure. A microprocessor 802 providing for the overall control of UE device 800 is operably coupled to a communication subsystem 804 that includes transmitter/receiver (transceiver) functionality for effectuating multi-mode scanning and communications over a plurality of bands. By way of example, a wide area wireless Tx/Rx module 806 and an AN Tx/Rx module 808 are illustrated. Although not particularly shown, each Tx/Rx module may include other associated components such as one or more local oscillator (LO) modules, RF switches, RF bandpass filters, A/D and D/A converters, processing modules such as digital signal processors (DSPs), local memory, etc. As will be apparent to those skilled in the field of communications, the particular design of the communication subsystem 804 may be dependent upon the communications networks with which the UE device is intended to operate. In one embodiment, the communication subsystem 804 is operable with both voice and data communications.

Microprocessor 802 also interfaces with further device subsystems such as auxiliary input/output (I/O) 818, serial port 820, display 822, keyboard 824, speaker 826, microphone 828, random access memory (RAM) 830, a short-range communications subsystem 832, and any other device subsystems generally labeled as reference numeral 833. To control access, a removal storage module or RSM (SIM/RUIM/USIM) interface 834 is also provided in communication with the microprocessor 802. In one implementation, RSM interface 834 is operable with an RSM card having a number of key configurations 844 and other information 846 such as identification and subscriber-related data as well as one or more PLMN lists described in detail hereinabove, as well as preferred/forbidden SSID/PLMN lists, network weights, filters and other databases where applicable.

Operating system software and other control software may be embodied in a persistent storage module (i.e., non-volatile storage) such as Flash memory 835. In one implementation, Flash memory 835 may be segregated into different areas, e.g., storage area for computer programs 836 as well as data storage regions such as device state 837, address book 839, other personal information manager (PIM) data 841, and other data storage areas generally labeled as reference numeral 843. Additionally, appropriate network discovery/scanning selection logic 840 may be provided as part of the persistent storage for executing the various network discovery/scanning and accelerated selection procedures set forth in the preceding sections. Additionally or alternatively, another logic module 848 may be provided for facilitating home network authentication, location interrogation, etc. Associated therewith is a storage module, designated SSID/PLMN Data, Preference Lists and Filters 838, for storing the SSID/PLMN lists, location-based selection and/or scanning filters, capability indicators, etc.

In view of the teachings set forth herein, the various logic blocks of wireless UE device 800 should be understood as comprising at least one or more of the following: a logic structure for interrogating a list of networks with which the wireless UE device has registered at least once in a given period of time; a logic structure for determining a network availability likelihood score associated with each of the list of networks; and a logic structure for selecting a network from the list of networks based on its network availability likelihood score. Additionally, the various embodiments of computational techniques described hereinabove may be implemented in suitable software and/or firmware associated with the UE device 800.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method for facilitating accelerated network selection by a wireless user equipment (UE) device, comprising:
   maintaining a list of networks;
   for each network in said list of networks, determining a respective network availability likelihood score associated therewith by one of (a) multiplying a connections count, corresponding to a number of prior connections of said wireless UE device with said network, by a connections count weighting factor of a weighting factors array; (b) multiplying a minutes count, corresponding to a total duration of prior connections of said wireless UE device with said network, by a minutes count weighting factor of said weighting factors array; and (c) multiplying a time lapse value, corresponding to an amount of elapsed time since at least one time stamp of at least one prior connection of said wireless UE device with said network, by a time lapse weighting factor of said weighting factors array; and prior to performing a full band scan, selecting a network from said list of networks based on said network availability likelihood score associated therewith.

2. The method for facilitating accelerated network selection by a wireless UE device as recited in claim 1, wherein said selecting is performed as part of an initial scan procedure.

3. The method for facilitating accelerated network selection by a wireless UE device as recited in claim 1, wherein said selecting is performed after one of losing coverage of a network with which said wireless UE device was previously registered and said wireless UE device is powered up.

4. The method for facilitating accelerated network selection by a wireless UE device as recited in claim 1, further comprising scanning in a frequency band associated with said network selected from said list of networks.

5. The method for facilitating accelerated network selection by a wireless UE device as recited in claim 1, wherein said list of networks includes a network that is operable with at least one of IEEE 802.11 standard, HiperLan standard, HiperLan II standard, Wi-Max standard, OpenAir standard, and Bluetooth standard.

6. The method for facilitating accelerated network selection by a wireless UE device as recited in claim 1, wherein said list of networks includes at least one of a General Packet Radio Service (GPRS) network, an Enhanced Data Rates for Global System for Mobile Communications (GSM) Evolution (EDGE) network, a 3rd Generation Partnership Project (3GPP)-compliant network, an Integrated Digital Enhanced Network (IDEN), a Code Division Multiple Access (CDMA) network, a Universal Mobile Telecommunications System (UMTS) network, a 3GPP2 network, and a Time Division Multiple Access (TDMA) network.

7. The method for facilitating accelerated network selection by a wireless UE device as recited in claim 1, wherein said list of networks is provided as part of a Universal Subscriber Identity Module (USIM) card, Removable User Identity Module (RUIM) card, a Subscriber Identity Module (SIM) card, a compact Flash card, a Secure Digital (SD) card, or a memory circuit integrated within said wireless UE device.

8. The method for facilitating accelerated network selection by a wireless UE device as recited in claim 1, further comprising: if multiple networks are determined to have identical network availability likelihood scores, choosing a particular network for service based on a priority parameter.

9. The method for facilitating accelerated network selection by a wireless UE device as recited in claim 1, wherein said list of networks is populated based on where said wireless UE device was last powered off.

10. A non-transitory computer-readable medium containing instructions that when executed by a computer cause the computer to perform a method for facilitating accelerated network selection by a wireless user equipment (UE) device, comprising:

maintaining a list of networks;

for each network in said list of networks, determining a respective network availability likelihood score by one of (a) multiplying a connections count, corresponding to a number of prior connections of said wireless UE device with said network, by a connections count weighting factor of a weighting factors array; (b) multiplying a minutes count, corresponding to a total duration of prior connections of said wireless UE device with said network, by a minutes count weighting factor of said weighting factors array; and (c) multiplying a time lapse value, corresponding to an amount of elapsed time since at least one time stamp of at least one prior connection of said wireless UE device with said network, by a time lapse weighting factor of said weighting factors array; and selecting a network from said list of networks based on said respective network availability score prior to performing a full-band scan.

11. The non-transitory computer-readable medium as recited in claim 10, further comprising instructions for adjusting at least one weighting factor of said weighting factors array such that a particular network is more likely to be selected upon a subsequent connection attempt.

12. The non-transitory computer-readable medium as recited in claim 10, further comprising at least one of:

instructions for updating said connections count corresponding to a particular network;

instructions for updating said minutes count corresponding to said particular network; and instructions for appending said time stamp to a list of time stamps corresponding to said particular network.

13. The non-transitory computer-readable medium as recited in claim 10, further comprising instructions for rearranging said networks in said list of networks in an order based on said respective network availability likelihood score.

14. The non-transitory computer-readable medium as recited in claim 13, further comprising:

instructions for iteratively attempting a connection to each network of said list of networks in accordance with a respective network availability likelihood scores until a connection attempt is successful;

instructions for updating said array of data values corresponding to a selected network for which said connection attempt is successful; and instructions for updating said weighting factors array.

15. A wireless user equipment (UE) device, comprising:

a storage module operative to contain a list of networks; and a selection module operative prior to a full band scan to select a network for an attempted connection based on a respective network availability likelihood score associated therewith, each network's network availability likelihood score being determined by one of (a) multiplying a connections count, corresponding to a number of prior connections of said wireless UE device with said network, by a connections count weighting factor of a weighting factors array; (b) multiplying a minutes count, corresponding to a total duration of prior connections of said wireless UE device with said network, by a minutes count weighting factor of said weighting factors array; and (c) multiplying a time lapse value, corresponding to an amount of elapsed time since at least one time stamp of at least one prior connection of said wireless UE device with said network, by a time lapse weighting factor of said weighting factors array.

16. The wireless UE device as recited in claim 15, further comprising an update module operative to update said weighting factors array based on history of connections by said wireless UE device with one or more networks of said list of networks.

17. The wireless UE device as recited in claim 15, further comprising means for manipulating a scanning order sequence based on respective network availability likelihood scores associated with each network of said list of networks.

18. The wireless UE device as recited in claim 15, wherein said storage module comprises a removable module.

19. The wireless UE device as recited in claim 15, wherein said storage module comprises a memory circuit integrated within said wireless UE device.

20. The non-transitory computer-readable medium as recited in claim 12, wherein said instructions for updating are triggered by one of a) a successful connection attempt, b) an unsuccessful connection attempt, c) a connection termination, d) powering on of the UE device, e) powering off of the UE device, f) loss of coverage and g) a periodic event.

\* \* \* \* \*